United States Patent [19]
Moribe et al.

[11] Patent Number: 5,818,812
[45] Date of Patent: Oct. 6, 1998

[54] OPTICAL RECORDING MEDIUM AND REPRODUCING METHOD FOR THE SAME

[75] Inventors: Mineo Moribe; Makoto Yoshioka, both of Kawasaki, Japan

[73] Assignee: Fujitsu Limited, Kawasaki, Japan

[21] Appl. No.: 632,014

[22] Filed: Apr. 15, 1996

[30] Foreign Application Priority Data

Sep. 22, 1995 [JP] Japan .................................. 7-244493

[51] Int. Cl.⁶ ....................................................... G11B 7/00
[52] U.S. Cl. ............................ 369/275.1; 369/54; 369/58
[58] Field of Search ............................ 369/275.2, 275.1, 369/275.3, 275.4, 275.5, 280, 47, 48, 53, 54, 58, 59, 13, 32

[56] References Cited

U.S. PATENT DOCUMENTS 5,541,904  7/1996  Fite et al. ............................... 369/54 X

FOREIGN PATENT DOCUMENTS

| 7161142 | of 0000 | Japan . |
|---|---|---|
| 62-279538 | 12/1987 | Japan . |
| 5242483 | 9/1993 | Japan . |
| 5257816 | 10/1993 | Japan . |
| 6223278 | 9/1994 | Japan . |
| 6274880 | 9/1994 | Japan . |

Primary Examiner—Muhammad N. Edun
Attorney, Agent, or Firm—Greer, Burns & Crain, Ltd.

[57] ABSTRACT

The invention provides an optical recording medium in which a medium judge code for confirming genuineness of the medium as well as a medium identification code peculiar to the medium are recorded as labels for preventing illegal copy of the optical recording medium and illegal usage of recorded data therein, so as to decrease the degree of degradation of the area for the medium identification code, and also provides a reproducing method for the optical recording medium.

23 Claims, 15 Drawing Sheets

RECORDING
ROTATION VELOCITY:1800rpm
WRITING POWER     :30mW
EXTERNAL MAGNETIC
            FIELD:-300 Oe
                 $\begin{pmatrix}\text{ERASING}\\\text{DIRECTION}\end{pmatrix}$

● RECORDING MARK

LINEAR VELOCITY 9 m/s
ERASING POWER 5 mW

OPTICAL RECORDING MEDIUM AND REPRODUCING METHOD FOR THE SAME

BACKGROUND OF THE INVENTION

1. Field of the Invention

The present invention relates to an optical recording medium for recording not only rewritable data but also irreversible data, and a reproducing method for the optical recording medium.

2. Description of Related Art

An optical recording medium is a commutative medium having a high speed and a large capacity, and various attempts have been made to make use of the optical recording medium as a core recording medium in rapidly developing multi-media. In accordance with such a movement, there is increasing risk of dishonest and illegal usage of a program and data caused by copying them on another recording medium.

The Applicant has disclosed, in Japanese Patent Application Laid-Open No. 5-257816 (1993), a method for preventing the illegal copy of a recording medium. In this method, data to be recorded are encoded by using a label peculiar to the medium (hereinafter referred to as the medium peculiar code) in a recording operation and recorded data are decoded by using the medium peculiar code in a reproducing operation. Furthermore, the Applicant has proposed, in Japanese Patent Application Nos. 6-223278 (1994) and 7-161142 (1995), a recording method for the medium peculiar code and an optical recording medium in which the medium peculiar code is recorded.

As is described in the aforementioned propositions, in reproducing the optical recording medium in which the medium peculiar code is recorded as a nonvolatile mark, an erasing operation is first conducted on an area where the medium peculiar code is recorded and then the medium peculiar code is reproduced. The reproduced medium peculiar code is compared with a code previously recorded in the medium. Only when the medium is confirmed to be a genuine product as a result of the comparison, a reproducing operation for recorded data can be conducted to obtain the data. Alternatively, data having been encoded by using the medium peculiar code are recorded in the medium, and the encoded data is decoded by using the reproduced medium peculiar code. Such a reproducing operation for the medium peculiar code can prevent the illegal copy. For example, when data are to be reproduced from an illegally copied optical recording medium, the medium peculiar code is not recorded as a nonvolatile mark in the copied optical recording medium, and hence, the illegally copied medium peculiar code is erased through the erasing operation. Thus, the medium peculiar code is prevented from being reproduced.

Furthermore, in the other cases the effect to prevent the illegal copy call be enhanced by reproducing the medium peculiar code at an appropriate timing so as to frequently confirm the used medium being a genuine product. For example, in the case where, after inserting a genuine optical recording medium into a drive and reproducing the medium peculiar code therein, the medium is replaced with an illegally copied medium and the reproducing process is to be proceeded, it is found that the used medium is not a genuine product in medium check frequently conducted in the reproducing process. As a result, the process cannot be continued.

However, the frequent check of the optical recording medium increases the number of accesses to the area where the medium peculiar code is recorded. Since the frequency of the erasing and reproducing operations on this area is increased, this area can be degraded and degraded. As a result, a correct reproducing signal of the medium peculiar code cannot be obtained, and the lifetime of the optical recording medium can be shortened.

SUMMARY OF THE INVENTION

The present invention was devised to overcome the aforementioned problems, and the object is providing an optical recording medium which can be used for a long period of time by decreasing the degree of degradation of a medium identification code used for preventing illegal copy of the optical recording medium, and a reproducing method for the optical recording medium.

The optical recording medium of this invention comprises a substrate and a recording film on the substrate. On the recording medium are recorded a medium identification code which is information peculiar to the medium and is recorded through irreversible change of the recording film, and a medium judge code which is unrewritably recorded for judging whether or not the medium identification code is recorded in the optical recording medium.

Accordingly, the medium is checked by using both the medium identification code, which can be peculiarly recorded in each medium but has low durability, and the medium judge code, which is used only for detecting irreversibly recorded data. This decreases the number of times of accessing the medium identification code which requires an accurate reproducing signal in a recording/reproducing operation on the optical recording medium, thereby decreasing the degree of degradation of the medium identification code.

In one aspect of the optical recording medium of the invention, the medium judge code is formed in the form of irregular pits. Therefore, although one medium judge code is recorded in a plurality of media, the medium judge code has high durability. Thus, the degradation of not only the medium identification code but also the medium judge code can be prevented.

In another aspect of the optical recording medium of the invention, the medium judge code is recorded through irreversible change of the recording film. Therefore, it is possible to make the medium judge code peculiar to the medium, and the medium judge code is not required to have high durability because there is no need to provide an accurate reproducing signal.

In one aspect of the optical recording medium of the invention, the recording film includes a magneto-optical recording area where data are recorded by changing the magnetization direction through beam irradiation and application of an external magnetic field. Therefore, in the magneto optical recording area, for example, data having been encoded by using the medium identification code are rewritably recorded, and the medium identification code or the medium judge code is irreversibly recorded.

In another aspect of the optical recording medium of the invention, the recording film includes a phase-change type recording area which is made of a material having different light reflectance in accordance with the phase state thereof. Therefore, in the phase-change type recording area, for example, data having been encoded by using the medium identification code are rewritably recorded, and the medium identification code or the medium judge code is irreversibly recorded.

In one aspect of the optical recording medium of the invention, the irreversible change of the recording film is a change of a magnetization characteristic caused by applying a high energy. For example, merely by replacing a light source in a recording optical system for recording rewritable data by the magneto-optical recording method with another light source having a higher power, the data can be irreversibly recorded. A general magneto-optical reproducing system can be used for detecting the change of the magnetization characteristic.

In another aspect of the optical recording medium of the invention, the irreversible change of the recording film is a deformation caused by applying a high energy. For example, merely by replacing a light source in a recording optical system for recording rewritable data on the phase-change type recording film with another light source having a higher power, the data can be irreversibly recorded. A general phase-change type reproducing optical system can be used for detecting the change of the intensity of reflected light.

The optical recording medium of the invention comprises a reproducing program including a step of conducting, an erasing operation for erasing rewritably recorded data, on an area where the medium identification code is recorded; a step of reproducing the medium identification code after the erasing operation; a step of reproducing data recorded on the recording film; and a step of decoding the reproduced data based on the reproduced medium identification code, and a medium judging program including a step of reproducing an area where the medium judge code is recorded; a step of judging whether or not a result obtained in the reproducing step is identical to the medium judge code; and a step of terminating a reproducing process of the optical recording medium when they are not identical.

Accordingly, illegal copy is prevented by judging whether or not the medium judge code is correctly reproduced as well as by identifying the medium by using the medium identification code.

In another aspect of the invention, the optical recording medium comprises a reproducing program including a step of conducting, an erasing operation for erasing rewritably recorded data, on an area where the medium identification code is recorded; a step of reproducing the medium identification code after the erasing operation; a step of reproducing data recorded on the recording film; and a step of decoding the reproduced data based on the reproduced medium identification code, and a medium judging program including a step of conducting the erasing operation on an area where the medium judge code is recorded; a step of recording a predetermined code in the area where the erasing operation is conducted; a step of reproducing the area where the predetermined code is recorded; a step of judging whether or not a result obtained in the reproducing step is identical to the predetermined code; and a step of terminating a reproducing process of the optical recording medium when they are identical.

Accordingly, illegal copy is prevented by judging whether or not the medium judge code is irreversibly recorded as well as by identifying the medium by using the medium identification code.

In one aspect of the invention, the optical recording medium comprises a recording program including a step of reproducing the medium identification code; a step of encoding data based on the reproduced medium identification code; and a step of recording the encoded data on the recording film. Therefore, by encoding data to be recorded by using the medium identification code peculiar to the medium, the recorded data can be obtained merely when the medium identification code is reproduced.

Alternatively, the reproducing method for an optical recording medium of this invention comprises a first step of conducting, an erasing operation for erasing rewritably recorded data, on an area for a medium identification code which is information peculiar to the medium and is recorded through irreversible change of a recording film; a second step of reproducing the area for the medium identification code after the first step; a third step of reproducing an area for a medium judge code which is unrewritably recorded; and a fourth step of terminating a reproducing process of the optical recording medium in accordance with a result obtained in the second or third step.

Accordingly, for example, when an illegally copied medium is used, the medium identification code is erased in the first step, and the reproducing process is terminated because the medium identification code cannot be reproduced in the second step. Alternatively, when a genuine product is used up to the second step and the genuine product is replaced with an illegally copied medium after completing the second step, the medium judge code cannot be reproduced in the third step and the reproducing process is terminated. By using the medium judge code only for detecting irreversible data recorded in a predetermined area, the degree of degradation of the medium identification code which requires an accurate reproducing signal can be decreased.

In one aspect of the reproducing method for an optical recording medium of the invention, the fourth step includes a step of judging whether or not a result obtained in the third step is identical to the medium judge code and terminating the reproducing process of the optical recording medium when they are not identical. Therefore, in the case where the medium judge code is recorded in the form of irregular pits, the recording medium is confirmed to be a genuine product when a reproducing signal obtained based on the change of reflected light quantity is identical to the medium judge code.

In another aspect of the reproducing method for an optical recording medium of the invention, the third step includes a step of conducting the erasing operation on the area for the medium judge code before reproducing this area and recording a predetermined code on the area where the erasing operation has been conducted, and the fourth step includes a step of judging whether or not a result obtained in the third step is identical to the predetermined code and terminating the reproducing process of the optical recording medium when they are identical.

Therefore, in the case where the medium judge code is recorded through the irreversible change of the recording film, the obtained reproducing signal is not identical to the predetermined code in a genuine product because the predetermined code cannot be recorded on the area where the erasing operation has been conducted. Thus, even though the degree of the degradation of the medium judge code is high, irreversibly recorded data can be detected.

The above and further objects and features of the invention will more fully be apparent from the following detailed description with accompanying drawings.

DETAILED DESCRIPTION OF THE INVENTION

The present invention will now be specifically described referring to drawings illustrating the embodiments thereof.

Embodiment 1

Figure 1:
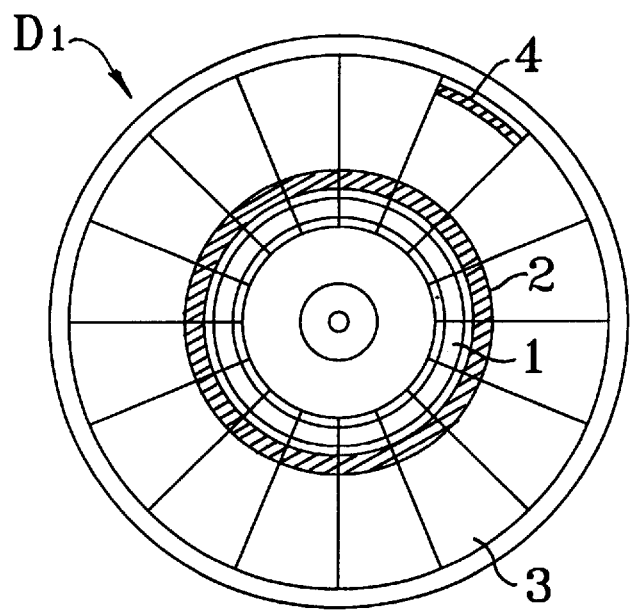
FIG. 1 is a schematic plane view for showing the configuration of an optical recording medium according to a first embodiment of the invention.
Figure 2:
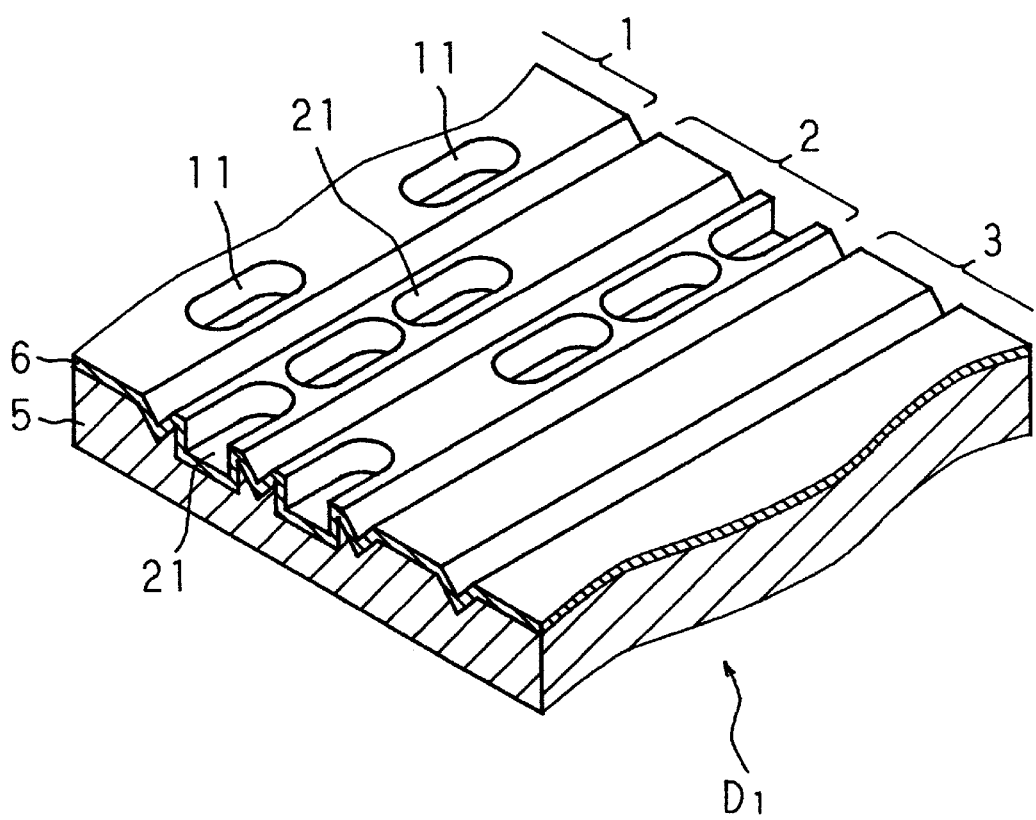
FIG. 2 is a partial perspective view for showing the configuration of the optical recording medium of the first embodiment.
Figure 3:
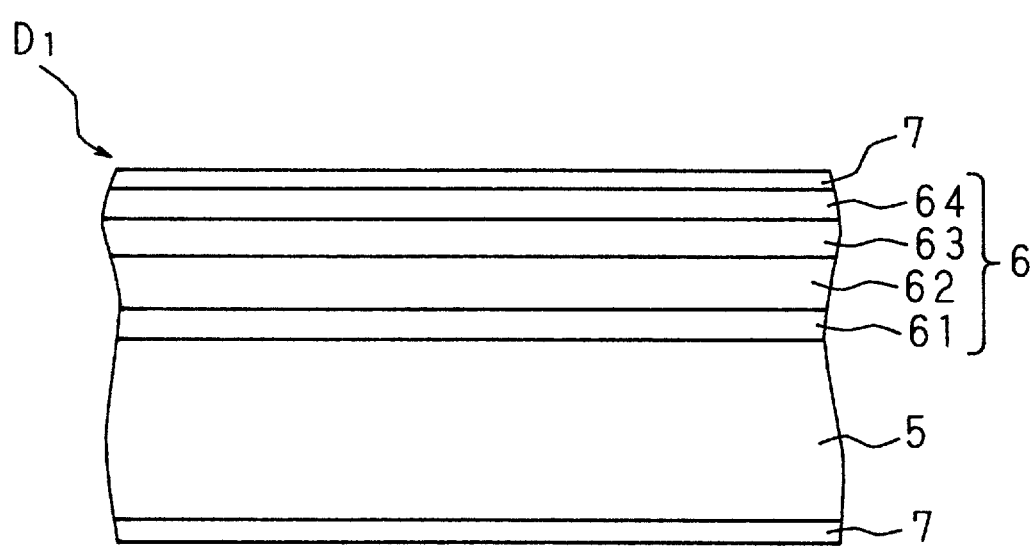
FIG. 3 is a sectional view for showing the film configuration of the optical recording medium of the first embodiment.

FIG. 1 is a schematic plane view for showing the configuration of an optical recording medium according to the first embodiment of the invention, FIG. 2 is a partial perspective view for showing the configuration of the optical recording medium of FIG. 1, and FIG. 3 is a sectional view for showing the film configuration of the optical recording medium of FIG. 1. In these drawings, $D_1$ indicates an optical disk in accordance with ISO/IEC 10090. The optical disk $D_1$ is a partial ROM comprising an area where a read-only signal is recorded in the form of a series of pits and an area where rewritable data are to be recorded. The optical disk $D_1$ comprises a substrate 5 in the shape of a disk, a recording film 6 coated on the substrate 5, and a UV polymerizable resin film 7 coated on the top and bottom surfaces. The substrate 5 is manufactured by injection molding using a stamper on which pits are formed through beam irradiation as described below. The recording film 6 is formed by laminating a Y-SiO$_2$ film 61 serving as a first protection film, a DyFeCo film 62 serving as a recording film, another Y-SiO$_2$ film 63 serving as a second protection film and an Al alloy film 64 serving as a reflecting film.

Furthermore, the optical disk $D_1$ includes, in this order from the inner side in the radial direction, a control track area 1 where a type of the disk, recording/reproducing systems for the disk and the like are recorded in the form of a series of pits 11, a medium judge code area 2 where a label used for checking the medium (hereinafter referred to as the medium judge code JD) is recorded in the form of a series of pits 21, a rewritable recording area 3 where a program and data are to be rewritably recorded, and a medium identification code area 4 where a label peculiar to the medium and formed through irreversible change of the recording film 6 (hereinafter referred to as the medium identification code ID) is recorded. The medium judge code area 2 is disposed within a ROM area of the partial ROM, and the medium identification code area 4 is disposed within the rewritable recording area 3.

Now, the manufacturing procedures for such an optical disk $D_1$ will be described. First, the stamper to be used for fabricating the substrate 5 is manufactured. The surface of a washed glass disk is coated with a photoresist having a predetermined thickness. A portion corresponding to a head guide groove is continuously irradiated with an argon laser beam, and simultaneously, the argon laser beam irradiates portions of the photoresist corresponding to the control track area 1, the medium judge code area 2 and a header area shown as a radial area in FIG. 1. In accordance with a regulated pattern of ISO/IEC 10090, information on the type of the disk, recording/reproducing systems and the like are formed in the control track area 1, the code used for checking the medium is formed in the medium judge code area 2, and signals corresponding to addresses of sectors are formed in the header area through exposing process, respectively.

The resultant disk is then developed to form the pits thereon. A Ni film serving as an electrode is then formed on the surface by evaporation, and a Ni film with a thickness of approximately 300 $\mu$m is plated on the top surface. Then, the glass disk is peeled off at the photoresist interface, and inner and outer circumferential surfaces and the back surface are properly shaped, thereby completing the stamper.

This stamper is mounted on an injection molding machine, so as to manufacture the disk-shaped substrate 5 of polycarbonate. On the surface of the substrate 5 are formed a series of pits corresponding to those on the stamper. On the surface bearing the pits, the Y-SiO$_2$ film 61 is coated, on which the DyFeCo film 62, the Y-SiO$_3$ film 63 and the Al alloy film 64 are laminated in this order by sputtering. Then, the UV polymerizable resin film 7 as a protection is formed on the surface of the Al alloy film 64 and the back surface of the substrate 5.

Figure 4:
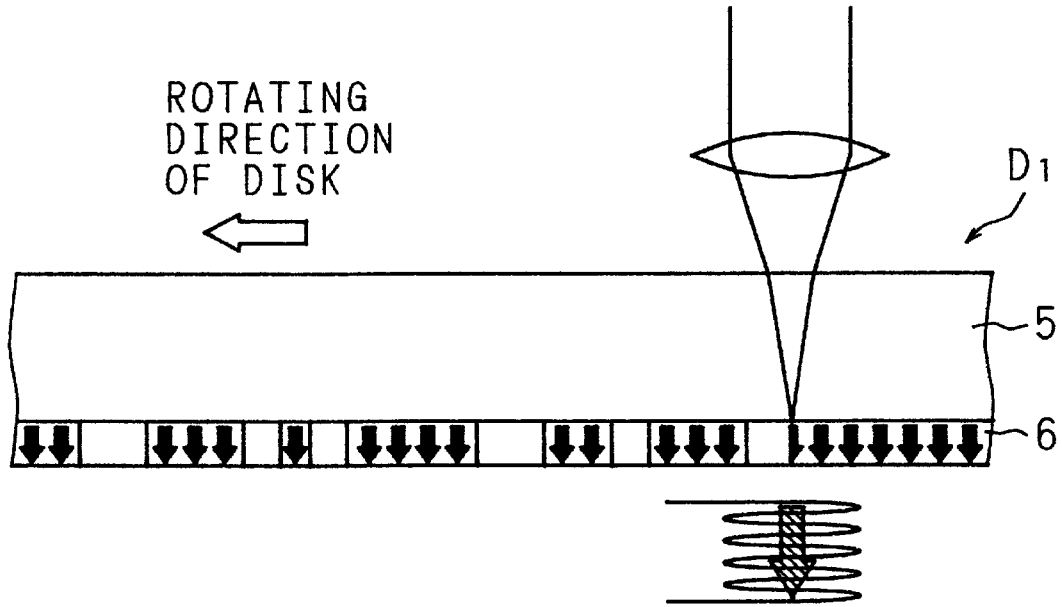
FIG. 4 illustrates recording procedures for a nonvolatile mark in the first embodiment.
Figure 5:
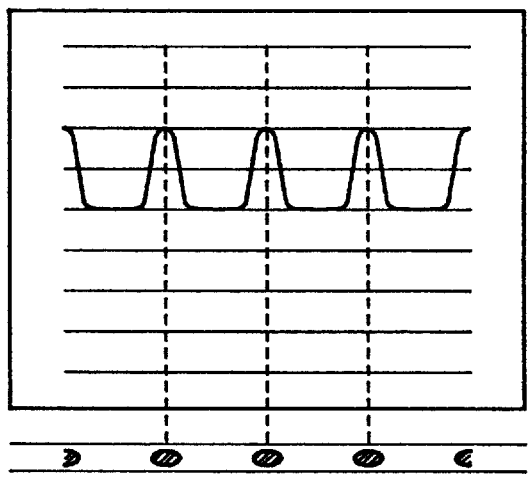
FIG. 5 shows a reproducing waveform of the nonvolatile mark used in the first embodiment.

In the medium identification code area 4 of the thus manufactured optical disk $D_1$, the recording film 6 is irreversibly changed, thereby recording the medium identification code ID. FIG. 4 is an explanatory diagram for showing recording procedures for a nonvolatile mark in this optical disk. The optical disk $D_1$ is rotated at a velocity of 1800 rpm and an external magnetic field is applied, so as to initialize the recording film 6 by aligning the magnetization direction on the entire recording film 6 in the erasing direction. Then, while a magnetic field of 300 Oe in the erasing direction is being applied, the medium identification code area 4 is irradiated through the back surface of the optical disk $D_1$ with a laser beam having a writing power of 30 mW, thereby writing the medium identification code ID such as a manufacture's serial number. As a result, the magnetization is lost at a portion irradiated with the laser beam, and hence, a reproducing signal can be detected through the rotation of a plane of polarization of reflected light in a reproducing operation. FIG. 5 shows a reproducing waveform obtained after the erasing operation is conducted on a nonvolatile mark formed under the aforementioned conditions. As is obvious from FIG. 5, the nonvolatile mark is irreversibly recorded and can be reproduced through a magneto optical reproducing waveform output. In the rewritable recording area 3, general rewritable data can be recorded through irradiation with a laser beam having a writing power of 8 mW at a rotation velocity of 3600 rpm.

Figure 6:
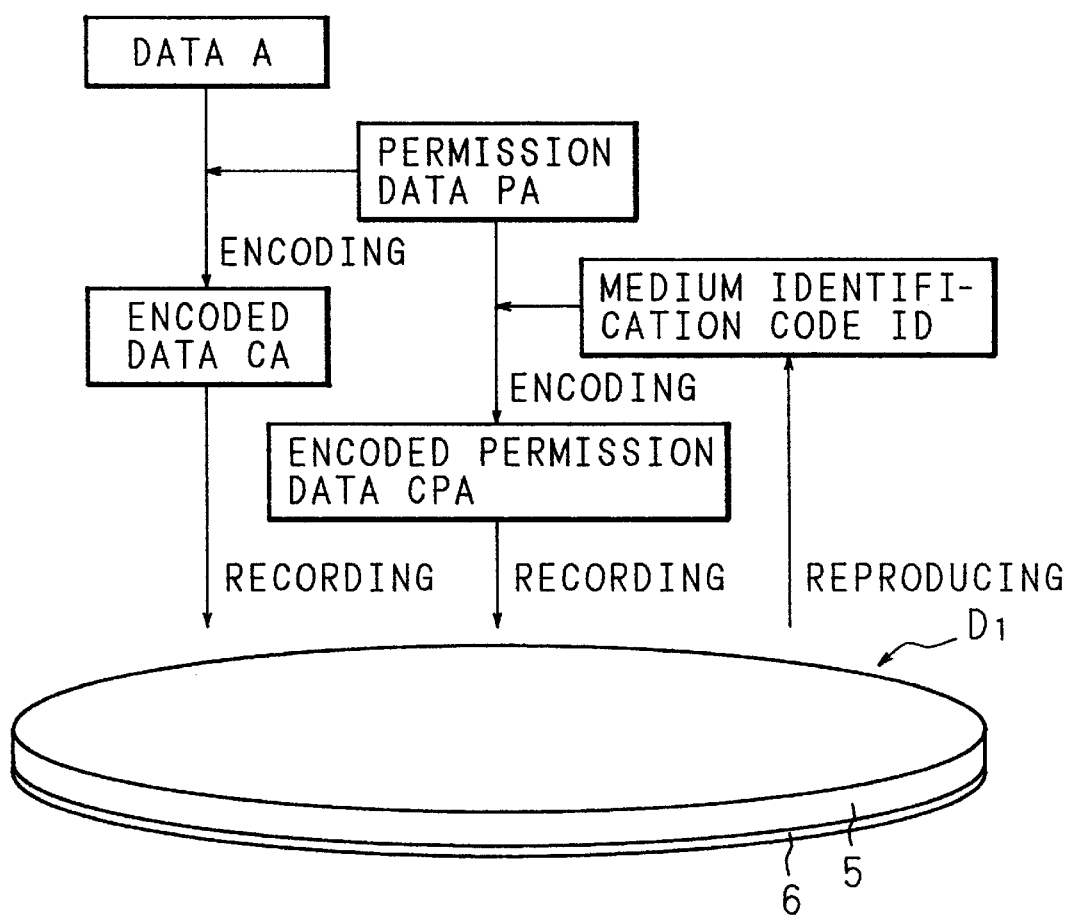
FIG. 6 illustrates recording procedures for encoded data in the first embodiment.

Next, data to be protected are recorded in the rewritable recording area 3 of the optical disk $D_1$. In this embodiment, the case where the data to be recorded are encoded will be exemplified. FIG. 6 is an explanatory diagram for showing data recording procedures in the optical disk of this embodiment. First, data A to be recorded are encoded by using permission data PA so as to obtain encoded data CA, and the encoded data CA are recorded in the rewritable recording area 3. Then, the medium identification code ID is reproduced from the medium identification code area 4 of the optical disk $D_1$. The reproduced medium identification code ID is used to encode the permission data PA so as to obtain encoded permission data CPA, and the encoded permission data CPA are recorded in the rewritable recording area 3. These recording procedures are conducted at a rotation velocity of 3600 rpm with a laser beam having a writing power of 8 mW.

Figure 7A:
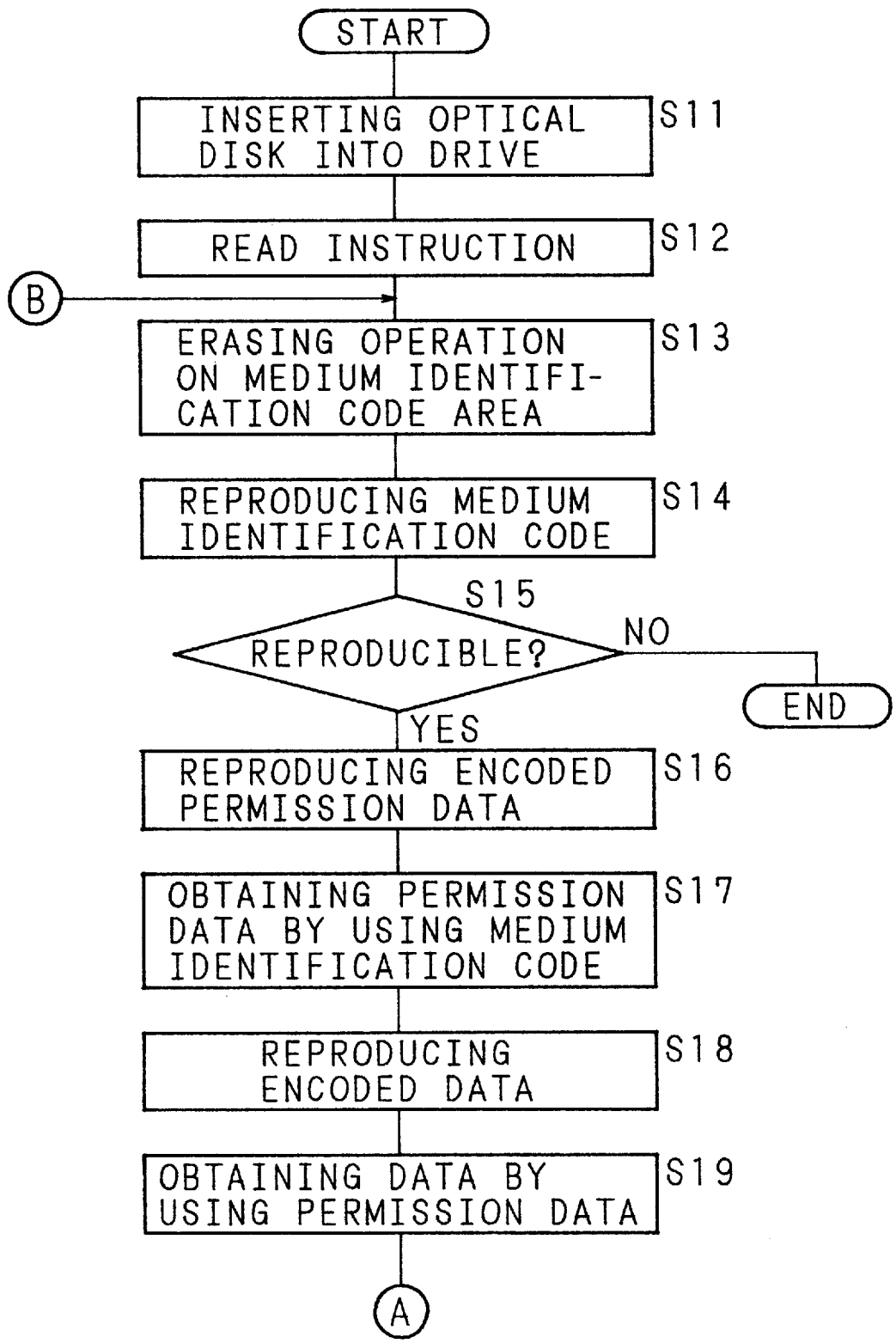
FIG. 7A and FIG. 7B are flowcharts for showing the reproducing procedures for the optical recording medium of the first embodiment.
Figure 7B:
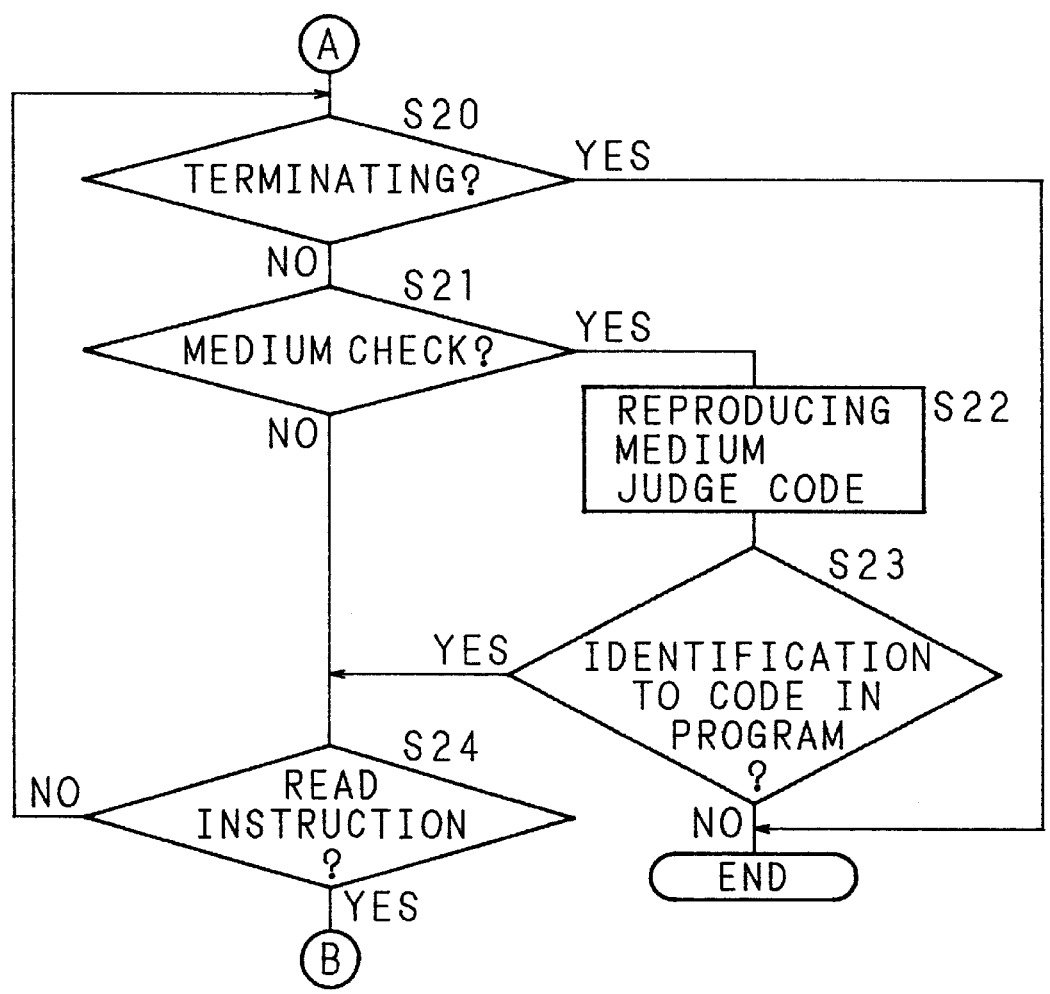
Figure 8:
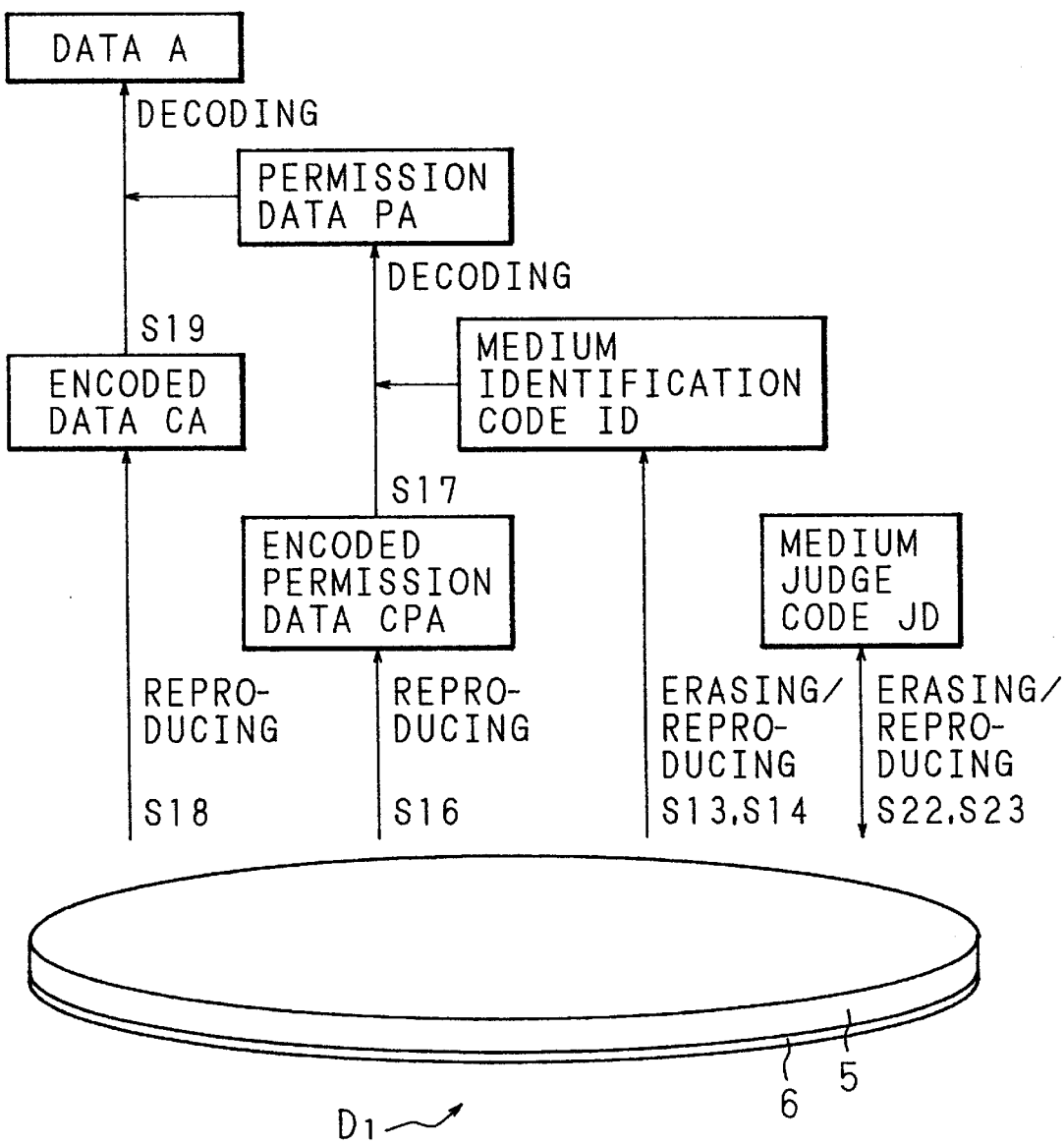
FIG. 8 illustrates reproducing procedures for encoded data in the first embodiment.

Now, an operation for reproducing the data A from the optical disk $D_1$ manufactured in the aforementioned manner will be described. FIG. 7A and FIG. 7B are a flowchart for showing reproducing procedures for the optical disk of this embodiment, and FIG. 8 is an explanatory diagram for showing data reproducing procedures in this optical disk. First, the optical disk $D_1$ is inserted into a drive (step S11). When a read instruction is provided (step S12), an erasing operation is conducted on the medium identification code area 4 (step S13) and the medium identification code ID is reproduced after the erasing operation (step S14). Then, it is judged whether or not the medium identification code ID has been reproduced (step S15). When the medium identification code ID has not been reproduced, the reproducing operation is terminated. When the medium identification code ID has been reproduced, the encoded permission data CPA are reproduced (step S16). By using the reproduced medium identification code ID, the encoded permission data CPA are decoded, thereby obtaining the permission data PA (step S17). Then, the encoded data CA are reproduced (step S18), and the reproduced encoded data CA are decoded by using the permission data PA, thereby obtaining the data A (step S19).

When subsequent process is to be conducted on the optical disk $D_1$ (step S20), it is determined whether or not medium check is to be executed (step S21). When the medium check is to be executed, the medium judge code JD recorded in the form of the pits is reproduced (step S22). The reproducing procedures for the medium judge code JD are conducted, similarly to the reproducing procedures on the control track area 1, by irradiating the pits with a laser beam so as to reproduce the data based on the change of reflection light quantity. It is then judged whether or not the reproduced medium judge code JD is identical to a code previously recorded in the optical disk $D_1$ (step S23). When they are not identical, the optical disk in the drive is found to be an illegal copy where the medium judge code is not recorded in the form of the pits, and hence, the process is terminated. When they are identical, the optical disk is confirmed to be a genuine product, and a subsequent read instruction is provided (step S24). After this, the above-described procedures such as the reproducing procedures for the medium identification code ID (steps S13 and S14) are repeated. It is possible to add an erasing operation, before the procedure in step S22, to be conducted on the area for the medium judge code JD recorded in the form of the pits. In this case, the medium judge code JD in an illegal product is erased through this erasing operation and hence, the medium judge code JD cannot be reproduced.

In the above-described reproducing procedures, the medium check is conducted immediately before the process in response to a read instruction. However, the timing for the medium check is not limited to this. The medium check can be conducted at predetermined time intervals, regardless of a currently executed process. In this case, it is preferred that the time intervals between the medium check are irregularly set.

The Applicant has proposed, in Japanese Patent Application Laid-Open No. 5-257816 (1993), a method for protecting electronic data by using a medium identification code, a method for encoding data to be recorded by using a medium peculiar key, and a method for decoding encoded data by using a medium peculiar key. The encoding and decoding procedures for the data A are conducted in accordance with the methods disclosed in Japanese Patent Application Laid-Open No. 5-257816 (1993), and hence the description is herein omitted.

In this manner, the medium judge code is used for checking the medium during a reproducing operation in this embodiment. Therefore, the medium identification code, which requires an accurate reproducing signal for reproducing, is less frequently reproduced. This decreases the degree of degradation of the recording area for the medium identification code and elongates the lifetime of the optical disk $D_1$. In addition, the medium judge code JD is recorded in the form of the pits, and hence, is prevented from degrading through the frequent reproducing operations.

Embodiment 2

Figure 9:
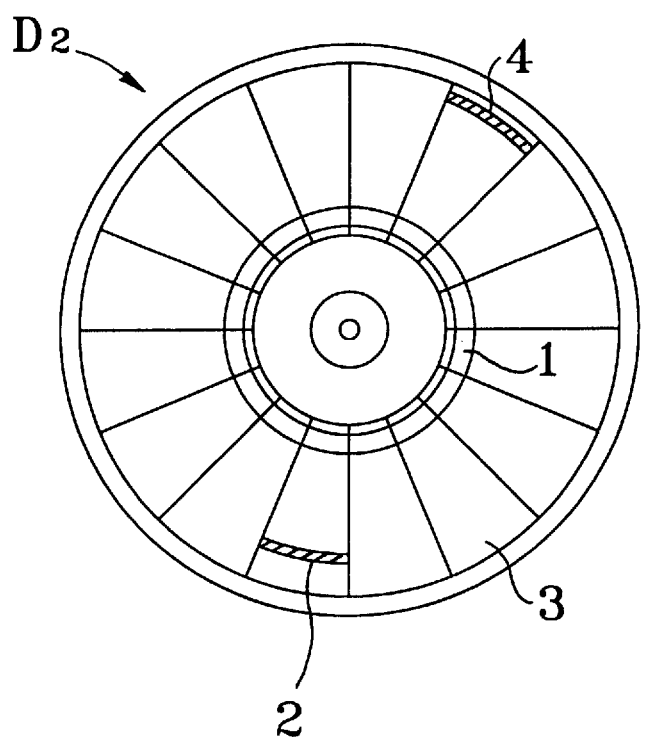
FIG. 9 is a schematic plane view for showing the configuration of an optical recording medium according to a second embodiment of the invention.

FIG. 9 is a schematic plane diagram for showing the configuration of an optical recording medium according to the second embodiment of the invention. An optical disk $D_2$ comprises, in this order from the inner side in the radial direction, a control track area 1 where a type of a disk, recording/reproducing systems for the disk and the like are recorded in the form of a series of pits, a rewritable recording area 3 where a program, data and the like are to be rewritably recorded, a medium judge code area 2 where a medium judge code JD is recorded through irreversible change of a recording film 6, and a medium identification code area 4 where a medium identification code ID is recorded through irreversible change of the recording film 6. The medium judge code area 2 and the medium identification code area 4 are disposed within the rewritable recording area 3. The remaining configuration is the same as that of Embodiment 1, and hence the description is omitted.

The manufacturing procedures for such an optical disk $D_2$ will now be described. This optical disk $D_2$ is manufactured in the same manner as is described with regard to the optical disk $D_1$ of Embodiment 1 except that the medium judge code JD is recorded not in the form of the pits but by an irreversible magneto-optical recording method. The medium judge code JD is recorded, while rotating the optical disk $D_2$ at a velocity of 1800 rpm and applying an external magnetic field in the erasing direction of 300 Oe, by irradiating the medium judge code area 2 through the back surface of the optical disk $D_2$ with a laser beam having a writing power of 30 mW. At this point, the medium judge code can be the same as or different from the medium identification code ID recorded under the same conditions. The magnetization in an area irradiated with the laser beam is lost, and a nonvolatile mark formed in this manner can be reproduced through the magneto optical reproducing waveform output. In the rewritable recording area 3, encoded data CA are recorded in the same manner as in Embodiment 1.

Figure 10:
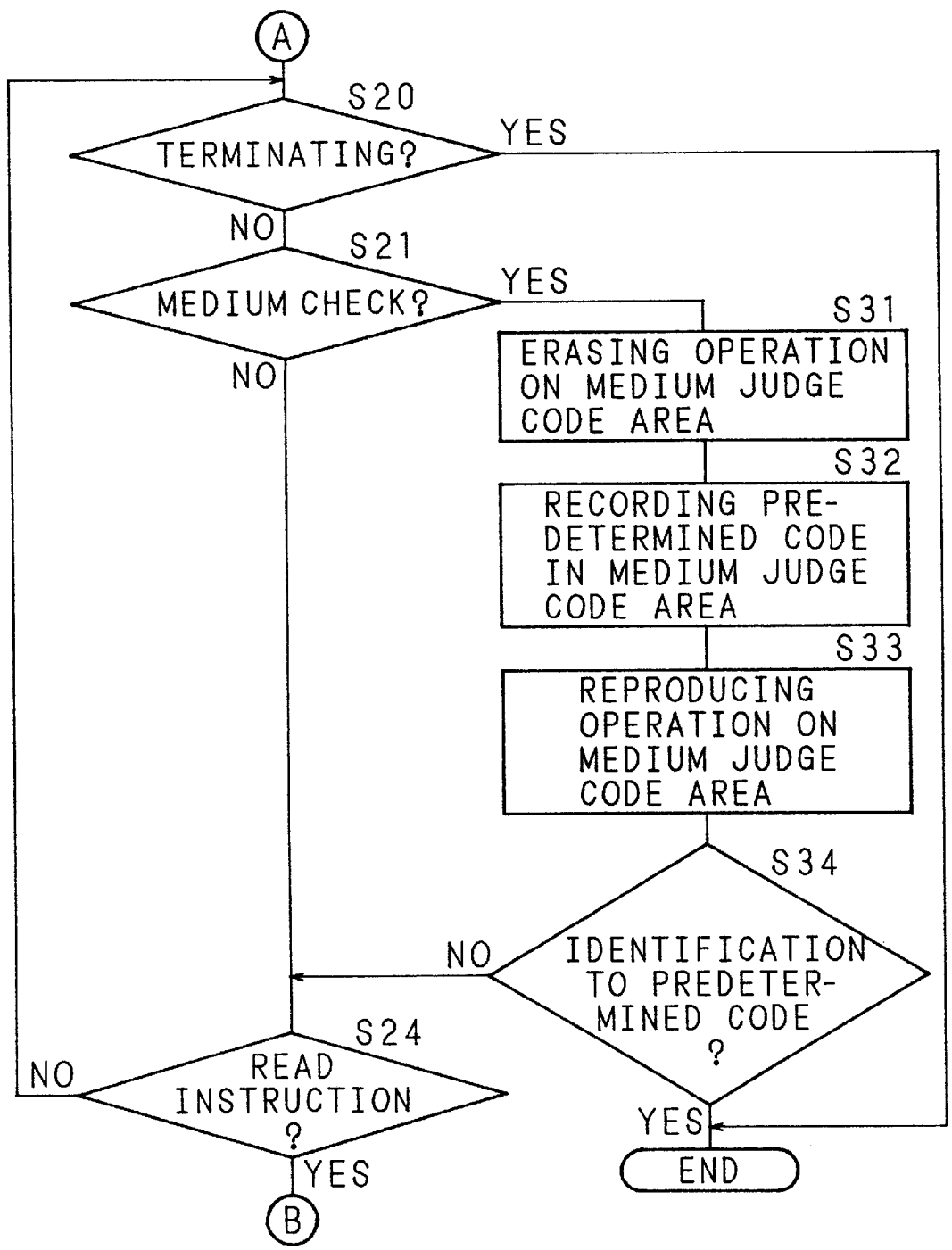
FIG. 10 is a flowchart for showing the reproducing procedures for the optical recording medium of the second embodiment.

Now, reproducing procedures for data A from the optical disk $D_2$ manufactured in the aforementioned manner will be described. FIG. 10 is a flowchart for showing the reproducing procedures for the optical disk $D_2$. After inserting the optical disk $D_2$ into a drive, it is confirmed that the optical disk is a genuine product on the basis of the medium identification code ID (step S15 in FIG. 7A). After decoding the data in the same manner as in Embodiment 1 (step S19 in FIG. 7A), it is decided whether or not medium check is to be executed (step S21). When the medium check is to be executed, an erasing operation is conducted on the medium judge code area 2 (step S31), and a predetermined code is recorded in this area (step S32). At this point, the erasing operation and the recording operation are conducted by the magneto-optical method. Then, the medium judge code area 2 is magneto-optically reproduced (step S33), and it is checked whether the reproduced code is identical to the predetermined code (step S34). When they are identical, it is found that the medium judge code is erased through the erasing operation and the predetermined code is recorded instead, and hence, the optical disk is found to be an illegal copy. Therefore, the process is terminated. When they are not identical, the optical disk is confirmed to be a genuine product in which the medium judge code is recorded as the nonvolatile mark, and a subsequent read instruction is provided (step S24). The other procedures are similar to those described in Embodiment 1 referring to FIG. 7A and FIG. 7B.

In this manner, the medium judge code is used for checking the medium during a reproducing operation in this embodiment. Therefore, the medium identification code, which requires an accurate reproducing signal for reproducing, is less frequently reproduced. This decreases the degree of degradation of the area for the medium identification code and elongates the a lifetime of the optical disk $D_1$. In addition, the medium judge code JD is recorded as a nonvolatile mark, and hence is largely degraded through repeated erasing and reproducing operations. However, there is no need to correctly reproduce the medium judge code JD because, as is described with regard to steps S31 through S34, the medium check is performed on the basis of whether or not a predetermined code can be recorded in the area for the medium judge code after the erasing operation. Therefore, although the degree of the degradation is high, it does not affect the lifetime of the optical disk $D_2$.

In Embodiments 1 and 2, when the nonvolatile mark is recorded by the magneto optical recording method, the optical recording medium is rotated at a lower velocity and is irradiated with a stronger beam than in recording a general recording mark, while applying an external magnetic field in the erasing direction. However, the recording conditions are not limited to those described above, but can be any conditions for irreversibly changing the recording film so as to form an unrewritable mark. For example, when a nonvolatile mark recorded by the methods proposed by the Applicant in Japanese Patent Application Nos. 6-223278 (1994) and 7-161142 (1995) is used for recording the medium identification code ID and the medium judge code JD, the same effect can be attained.

Furthermore, in Embodiment 2, the medium judge code JD is recorded as a nonvolatile mark in the medium judge code area 2 within the rewritable recording area 3. However, when the medium judge code JD is recorded in the form of pits in the medium judge code area 2, the same effect can be attained. Also in this case, the erasing operation on the medium judge code area 2 where the pits are formed (i.e., the procedure in step S31), the recording operation of a predetermined code (i.e., the procedure in step S32) and the reproducing operation of the medium judge code area 2 (i.e., the procedure in step S33) are conducted by the magneto-optical method. Since the predetermined code can be recorded on an illegally copied medium, the medium can be found to be an illegal product. Furthermore, the medium judge code JD can be formed in the form of pits in the medium judge code area 2 within the rewritable recording area 3, so as to be reproduced based on the change of reflected light quantity. In this case, as is shown in FIG. 7, the medium judge code JD cannot be reproduced from an illegal copy in the reproducing operation for the medium judge code JD (step S22), and thus, the disk is found to be an illegal product.

In Embodiments 1 and 2, the recording film 6 is made of a DyFeCo amorphous alloy, but the material for the recording film is not limited to this. Any amorphous alloy vertical magnetization film such as a TbFeCo amorphous alloy film and a GdFeCo/TbFeCo amorphous alloy multi-layered film can attain the same effect.

Embodiment 3

Now, a phase-change type optical recording medium according to the invention will be described.

Figure 11:
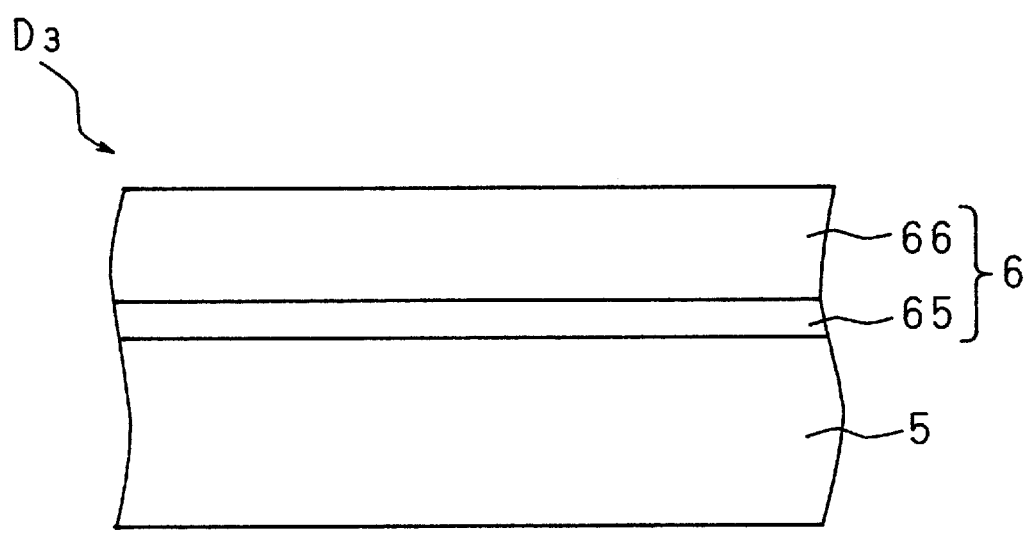
FIG. 11 is a sectional view for showing the film configuration of an optical recording medium of a third embodiment of the invention.

FIG. 11 is a sectional view for showing the film configuration of an optical recording medium according to the third embodiment of the invention. An optical disk $D_3$ is a partial ROM in which a read-only signal is recorded in the form of a series of pits and data can be rewritably recorded in a phase-change type recording area. The optical disk $D_3$ comprises a disk-shaped substrate 5 and a recording film 6 coated on the substrate 5. The substrate 5 is manufactured by the injection molding using a stamper on which pits are formed through beam irradiation. The recording film 6 includes lamination of a ZnS film 65 as a base film and an InSb film 66 as a recording film.

In the optical disk $D_3$, the recording film 6 is made of a phase-change type recording material, and data can be rewritably recorded in a rewritable recording area 3 by a phase-change type recording method. The remaining configuration is similar to that of the optical recording medium described in Embodiment 1, and hence like reference numerals are used to refer to like elements and the description is omitted.

The manufacturing procedures for the optical disk $D_3$ will now be described. The substrate 5 molded by using the stamper is coated with the recording film 6 of the phase-change type recording material. On the surface of the substrate 5 molded by using the stamper, pits corresponding to those on the stamper are formed. On the surface bearing the pits is formed the ZnS film 65, on which the InSb film 66 is laminated by the sputtering. The optical disk $D_3$ is manufactured in the same manner as the optical disk $D_1$ of Embodiment 1 except that data such as encoded data CA are recorded in the rewritable recording area 3 by the phase-change type recording method.

Figure 12:
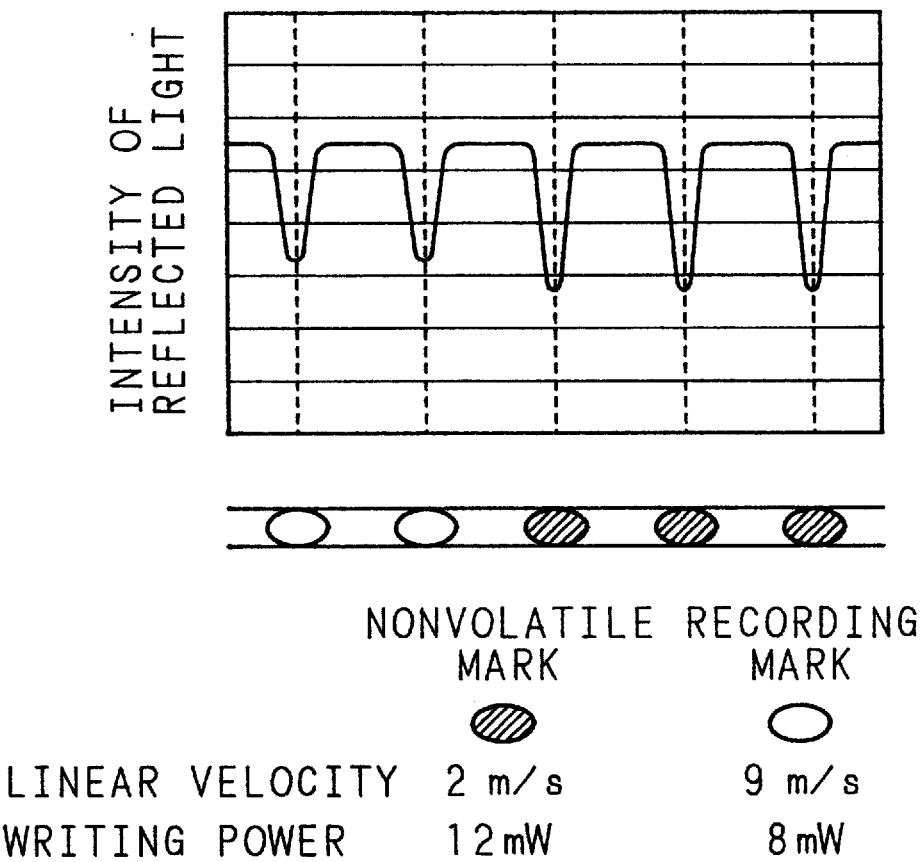
FIG. 12 shows the intensity of reflected light in a nonvolatile mark and a general recording mark in the optical recording medium of the third embodiment.
Figure 13:
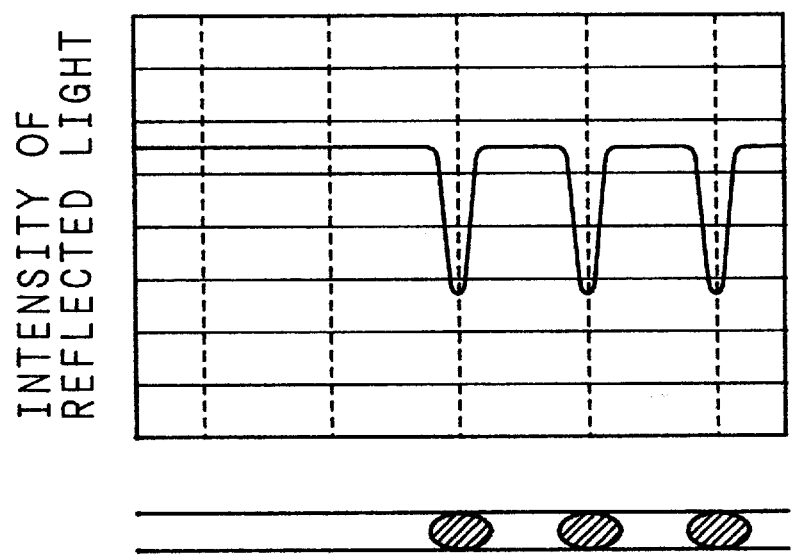
FIG. 13 shows the intensity of reflected light in the nonvolatile mark in the optical recording medium of the third embodiment.

A medium identification code ID is recorded, while rotating the optical disk $D_3$ at a linear velocity of 2 m/sec. by irradiating a medium identification code area 4 through the back surface of the optical disk $D_3$ with a laser beam having a writing power of 12 mW. In a portion irradiated with the laser beam, the recording film 6 is deformed to have a hole, and a nonvolatile mark thus formed can be reproduced by detecting a reproducing signal based on the change of the intensity of reflected light in a reproducing operation. FIG. 12 shows the intensity of reflected light of a reproducing laser beam in the nonvolatile mark formed under the aforementioned conditions and in a recording mark formed by a general recording method. FIG. 13 shows the intensity of reflected light after conducting an erasing operation on this area. As is obvious from FIG. 13, the general recording mark is erased through the erasing operation but the nonvolatile mark exhibits the reflected light intensity at the same level as that obtained before the erasing operation. Thus, it can be confirmed that an irreversible recording operation has been conducted on this area. The general recording mark is recorded at a linear velocity of 9 m/sec. with a laser beam having a writing power of 8 mW, and the laser beam used in the erasing operation has an erasing power of 5 mW.

Figure 14:
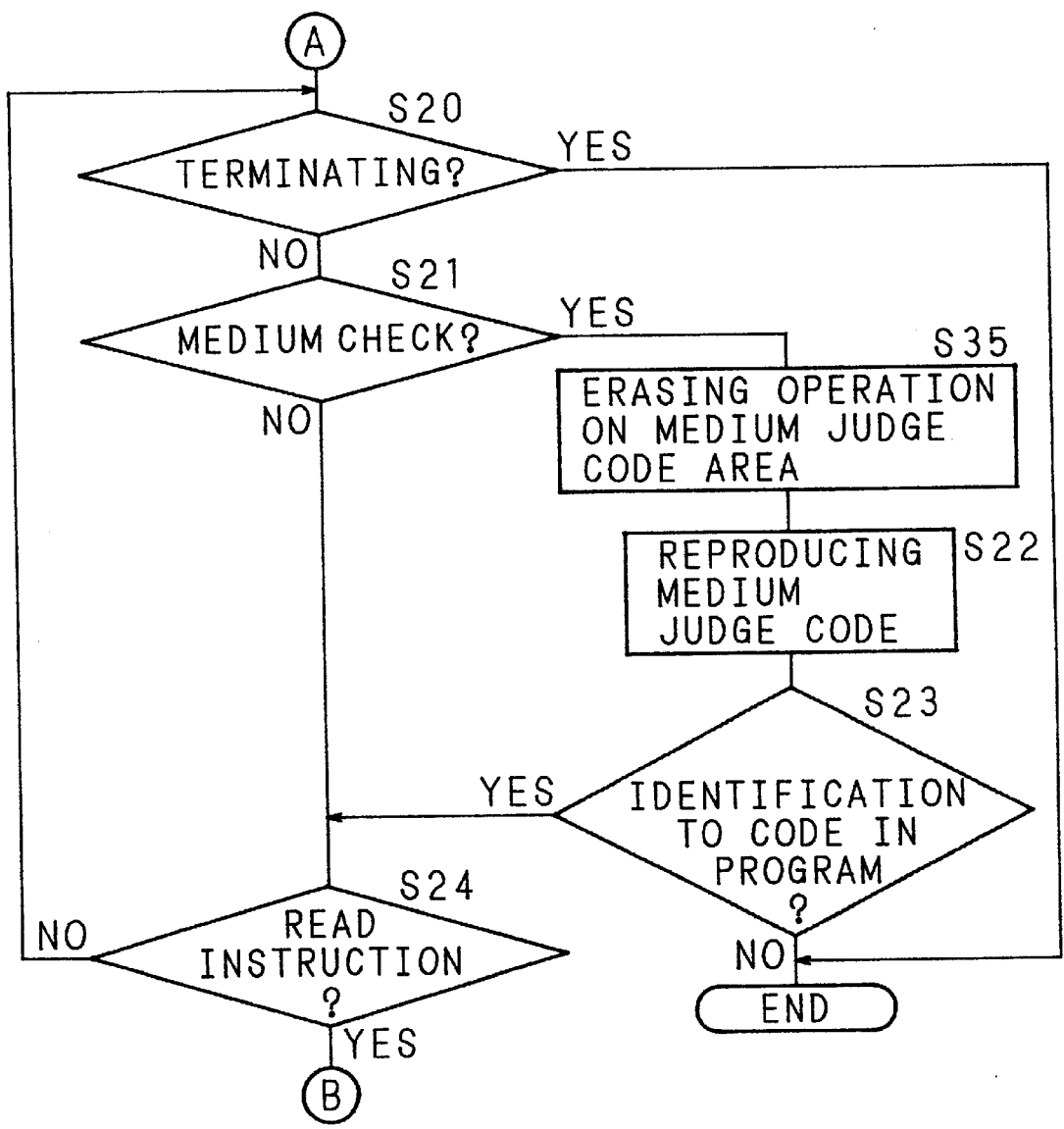
FIG. 14 is a flowchart for showing the reproducing procedures for the optical recording medium according to the fourth embodiment of the invention.

In the optical disk $D_3$, data A to be protected are recorded in the rewritable recording area 3 as in Embodiments 1 and 2. Now, reproducing procedures for the data A from the optical disk $D_3$ will be described. FIG. 14 is a flowchart for showing the reproducing procedures for the optical disk $D_3$ of this embodiment. When the medium check is to be executed (step S21), an erasing operation is conducted oil a medium judge code area 2 (step S35). This erasing operation is conducted by the phase-change type method. After the erasing operation, the medium judge code JD is reproduced through the detection of the change of reflected light quantity (step S22), and it is judged whether or not the reproduced medium judge code JD is identical to a code previously recorded in the optical disk $D_3$ (step S23). When they are not identical, the optical disk in the drive is found to be an illegally copied product where the medium judge code is not irreversibly recorded, and the process is terminated. When they are identical, the disk is confirmed to be a genuine product, and a subsequent read instruction is a provided (step S24). The other procedures are similar to those described in Embodiment 1 referring to FIG. 7A and FIG. 7B.

In this manner, the medium judge code JD is used for checking the medium during a reproducing operation of this phase-change type optical disk $D_3$. Therefore, the medium identification code ID is less frequently reproduced, thereby decreasing the degree of degradation of the area for the medium identification code ID and elongating the lifetime of the optical disk $D_3$. In addition, the medium judge code JD is recorded in the form of pits, and hence, is prevented from degrading through frequent reproducing operations.
Embodiment 4

When a medium judge code area 2 is formed within a rewritable recording area 3 of a phase-change type optical disk and a medium judge code JD is irreversibly recorded under the same conditions as those for recording a medium identification code ID described in Embodiment 3, such a phase change type medium can be checked through the reproducing procedures shown in FIG. 14. Alternatively, by adopting the reproducing procedures shown in FIG. 10, the effect of Embodiment 2 can be attained.

Furthermore, when the medium judge code JD is formed in the medium judge code area 2 within the rewritable recording area 3 in the form of pits, the effect of Embodiment 3 can be attained by adopting any of the producing procedures shown in FIGS. 10 and 14.

In Embodiments 3 and 4, the recording film 6 is made of an InSb alloy, but the material for the recording film 6 is not limited to this. The same effect can be attained by using any phase-change type material which can be deformed by a higher power than that used in a general recording operation.

In Embodiments 1 and 3, the medium judge code JD is formed in the ROM area of the partial ROM, but the area for the medium judge code is not limited to this. When the medium judge code JD is formed in a space area in the control track area 1 or in another area excluding a user area, the same effect can be attained.

Furthermore, in the aforementioned embodiments, after inserting the optical disk D into the drive and reproducing the medium identification code ID once, the medium is checked by using the medium judge code JD immediately before a predetermined process or at irregular time intervals. However, the timing of using the medium identification code ID and the medium judge code JD is not limited to this, but the medium identification code ID and the medium judge code JD can be used in an appropriate proportion. In this case, the frequency of using the medium identification code ID is preferably set lower.

Additionally, in the aforementioned embodiments, the medium is checked at the time of activating a system by using a the medium identification ID for encoding/decoding data, but the method for checking the medium is not limited to this. It is possible to arrange that the medium identification code ID is reproduced and an obtained reproducing signal is compared with a code previously recorded in the medium, thereby checking the medium.

As described above, the optical recording medium of the invention includes both a medium identification code and a medium judge code for the purpose of determining whether or not an optical recording medium is a genuine product, and the medium judge code is used only for detecting an irreversibly formed mark. As a result, the frequency of using the medium identification code which requires an accurate reproducing signal for reproducing is decreased and the degree of the degradation of the area for the medium identification code is decreased, thereby elongating a usable time period of the optical recording medium. In addition, when the medium judge code is formed in the form of irregular pits, it can achieve a high durability, and when the medium judge code is irreversibly recorded, the recorded medium judge code can be peculiar to the medium. Furthermore, the invention is applicable to an optical recording medium comprising a recording film in which data can be recorded and reproduced by the magneto-optical method and also to an optical recording medium comprising a recording film in which data can be recorded and reproduced in the phase-change type method.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical recording medium, comprising:
   a substrate; and
   a recording film on the substrate,
   wherein the recording film includes an unrewritable medium identification code peculiar to the optical recording medium and is recorded through irreversible change of the recording film, and an unrewritable medium judge code for judging whether or not the medium identification code is recorded in the optical recording medium.

2. The optical recording medium according to claim 1, wherein the medium judge code is recorded in the form of irregular pits.

3. The optical recording medium according to claim 1, wherein the medium judge code is recorded through irreversible change of the recording film.

4. The optical recording medium according to claim 3, wherein the irreversible change of the recording film is a change of a magnetization characteristic caused by applying a high energy.

5. The optical recording medium according to claim 3, wherein the irreversible change of the recording film is deformation caused by applying a high energy.

6. The optical recording medium according to claim 1, wherein the recording film includes a magneto-optical recording area where data can be recorded by changing a magnetization direction through beam irradiation and application of an external magnetic field.

7. The optical recording medium according to claim 1, wherein the recording film includes a phase-change type recording area which is made of a material having different light reflectance in accordance with a phase state thereof.

8. A method for reproducing an optical recording medium including recording film on a substrate, comprising:

a first step of conducting, an erasing operation for erasing rewritably recorded data, on an area where a medium identification code, which is information peculiar to the optical recording medium and is recorded on the recording film through irreversible change of the recording film, is recorded;

a second step of reproducing the area for the medium identification code after the first step;

a third step of reproducing an area for a medium judge code, which is unrewritably recorded on the recording film; and a fourth step of terminating a reproducing process of the optical recording medium in accordance with a result obtained in the second or third step.

9. The reproducing method for an optical recording medium according to claim 8, wherein the fourth step includes a step of judging whether or not the result obtained in the third step is identical to the medium judge code so as to terminate the reproducing process of the optical recording medium when the result is not identical to the medium judge code.

10. The reproducing method for an optical recording medium according to claim 8, wherein the third step includes a step of conducting the erasing operation on the area for the medium judge code before reproducing the area for the medium judge code and recording a predetermined code on the area where the erasing operation has been conducted; and the fourth step includes a step of judging whether or not the result obtained in the third step is identical to the predetermined code so as to terminate the reproducing process of the optical recording medium when the result is identical to the predetermined code.

11. A computer readable optical recording medium having an unrewritable medium identification code peculiar to the optical recording medium, the unrewritable medium identification being recorded through irreversible change of a recording film, the recording medium further having an unrewritable medium judge code, recorded in the form of irregular pits, for judging whether or not the medium identification code is recorded in the optical recording medium, said recording medium further comprising:

a reproducing program including:
a step of conducting an erasing operation for erasing rewritably recorded data, on an area where the medium identification code is recorded;
a step of reproducing the medium identification code after the erasing operation;
a step of reproducing data recorded on the optical recording medium; and
a step of decoding the reproduced data using the reproduced medium identification code; and a medium judging program including:
a step of reproducing the medium judge code from the recording medium;
a step of judging whether the medium judge code is identical to the medium identification code; and
a step of terminating a reproducing process of the optical recording medium when the medium judge code is not identical to the medium identification code.

12. A computer readable optical recording medium according to claim 11, wherein the recording medium includes a magneto-optical recording area in which data is recorded by changing a magnetization direction through beam irradiation and application of an external magnetic field.

13. A computer readable optical recording medium according to claim 11, wherein on the recording film is recorded:

a recording program including:
a step of reproducing the medium identification code;
a step of encoding data using the medium identification code; and
a step of recording the encoded data on the recording film.

14. A computer readable optical recording medium according to claim 11, wherein said medium judging program includes:

a step of conducting an erasing operation for erasing rewritably recorded data, on an area where the medium judge code is recorded;
a step of recording a predetermined code in the area where the erasing operation for the medium judge code was performed;
a step of reproducing the medium judge code from the area in which the predetermined code was recorded;
a step of judging whether the medium judge code is identical to the predetermined code; and
a step of terminating a reproducing process of the optical recording medium when the medium judge code is identical to the predetermined code.

15. A computer readable optical recording medium according to claim 14, wherein the recording medium includes a phase-change type recording area which is made of a material having a different light reflectance in accordance with a phase state thereof.

16. A computer readable optical recording medium according to claim 14, wherein on the recording film is recorded:

a recording program including:
a step of reproducing the medium identification code;
a step of encoding data using the medium identification code; and
a step of recording the encoded data on the recording film.

17. A computer readable optical recording medium according to claim 10, wherein said judge code is recorded through irreversible change of the recording film, and said medium judging program includes:
- a step of conducting an erasing operation for erasing rewritably recorded data, on an area where the medium judge code is recorded;
- a step of recording a predetermined code in the area where the erasing operation for the medium judge code was performed;
- a step of reproducing the medium judge code from the area in which the predetermined code was recorded;
- a step of judging whether the medium judge code is identical to the predetermined code; and
- a step of terminating a reproducing process of the optical recording medium when the medium judge code is identical to the predetermined code.

18. A computer readable optical recording medium according to claim 17, wherein the recording medium includes a magneto-optical recording area in which data is recorded by changing a magnetization direction through beam irradiation and application of an external magnetic field.

19. A computer readable optical recording medium according to claim 17, wherein the recording medium includes a phase-change type recording area which is made of a material having a different light reflectance in accordance with a phase state thereof.

20. A computer readable optical recording medium according to claim 17, wherein on the recording film is recorded:
- a recording program including:
  - a step of reproducing the medium identification code;
  - a step of encoding data using the medium identification code; and
  - a step of recording the encoded data on the recording film.

21. A method for reproducing data from a computer readable optical recording medium having an unrewritable medium identification code peculiar to the optical recording medium, the unrewritable medium identification being recorded through irreversible change of a recording film, the recording medium further having an unrewritable medium judge code, recorded in the form of irregular pits, for judging whether or not the medium identification code is recorded in the optical recording medium, said reproducing method comprising the steps:
- conducting an erasing operation for erasing rewritably recorded data, on an area where the medium identification code is recorded;
- reproducing the medium identification code after the erasing operation;
- reproducing the medium judge code from the recording medium;
- judging whether the medium judge code is identical to the medium identification code, and if so:
  - reproducing data recorded on the optical recording medium; and
  - decoding the reproduced data using the reproduced medium identification code.

22. A method for reproducing data from a computer readable optical recording medium having an unrewritable medium identification code peculiar to the optical recording medium, the unrewritable medium identification being recorded through irreversible change of a recording film, the recording medium further having an unrewritable medium judge code, recorded in the form of irregular pits, for judging whether or not the medium identification code is recorded in the optical recording medium, said reproducing method comprising the steps:
- conducting an erasing operation for erasing rewritably recorded data, on an area where the medium identification code is recorded;
- conducting an erasing operation for erasing rewritably recorded data, on an area where the medium judge code is recorded;
- recording a predetermined code in the area where the erasing operation for the medium judge code was performed;
- reproducing information from the area in which the predetermined code was recorded;
- judging whether the reproduced information is identical to the predetermined code, and if not:
  - reproducing the medium identification code;
  - reproducing data recorded on the optical recording medium; and
  - decoding the reproduced data using the reproduced medium identification code.

23. A method for reproducing data from a computer readable optical recording medium having an unrewritable medium identification code peculiar to the optical recording medium and an unrewritable medium judge code for judging whether or not the medium identification code is recorded in the optical recording medium, the respective unrewritable codes being recorded through irreversible change of a recording film, said reproducing method comprising the steps:
- conducting an erasing operation for erasing rewritably recorded data, on an area where the medium identification code is recorded;
- conducting an erasing operation for erasing rewritably recorded data, on an area where the medium judge code is recorded;
- recording a predetermined code in the area where the erasing operation for the medium judge code was performed;
- reproducing information from the area in which the predetermined code was recorded;
- judging whether the reproduced information is identical to the predetermined code, and if not:
  - reproducing the medium identification code;
  - reproducing data recorded on the optical recording medium; and
  - decoding the reproduced data using the reproduced medium identification code.

* * * * *

UNITED STATES PATENT AND TRADEMARK OFFICE
CERTIFICATE OF CORRECTION

PATENT NO. : 5,818,812
DATED : October 6, 1998
INVENTOR(S) : Moribe et al.

It is certified that error appears in the above-identified patent and that said Letters Patent is hereby corrected as shown below:

Column 9, line 41, delete "$D_1$" and insert --$D_2$-- therefor

Signed and Sealed this

Tenth Day of August, 1999

Attest:

Q. TODD DICKINSON

Attesting Officer

Acting Commissioner of Patents and Trademarks